United States Patent
Mishina et al.

(10) Patent No.: US 11,320,282 B2
(45) Date of Patent: May 3, 2022

(54) DRIVING CONTROL METHOD AND DRIVING CONTROL DEVICE

(71) Applicant: Nissan Motor Co., Ltd., Yokohama (JP)

(72) Inventors: Yohei Mishina, Kanagawa (JP); Yoshiro Takamatsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 93 days.

(21) Appl. No.: 16/498,650

(22) PCT Filed: Mar. 31, 2017

(86) PCT No.: PCT/JP2017/013813
§ 371 (c)(1),
(2) Date: Sep. 27, 2019

(87) PCT Pub. No.: WO2018/179415
PCT Pub. Date: Oct. 4, 2018

(65) Prior Publication Data
US 2020/0096355 A1   Mar. 26, 2020

(51) Int. Cl.
*G01C 21/34* (2006.01)
*G05D 1/02* (2020.01)

(52) U.S. Cl.
CPC ..... *G01C 21/3492* (2013.01); *G01C 21/3484* (2013.01); *G05D 1/0217* (2013.01); *G05D 1/0285* (2013.01); *G05D 2201/0212* (2013.01)

(58) Field of Classification Search
CPC ............ G01C 21/3492; G01C 21/3484; G01C 21/3697; G01C 21/3453; G01C 21/36;
(Continued)

(56) References Cited

U.S. PATENT DOCUMENTS

2002/0120396 A1   8/2002   Boies et al.
2013/0211656 A1*  8/2013   An .................. G05D 1/0285
                                                           701/25
(Continued)

FOREIGN PATENT DOCUMENTS

EP        2972096 A1    1/2016
JP    2000-158973 A     6/2000
(Continued)

OTHER PUBLICATIONS

Anonymous: "Spurhalteassistent | mein-autolexikon.de", Jun. 5, 2016 (Jun. 5, 2016), XP055857758, Retrieved from the Internet: URL:https://web.archive.org/web/20160605224305/https://www.meinautolexikon.de/fahrerassistenzsysteme/spurhalteassistent.html.
(Continued)

*Primary Examiner* — Rodney A Butler
(74) *Attorney, Agent, or Firm* — Young Basile Hanlon & MacFarlane, P.C.

(57) ABSTRACT

A driving control method includes referring to map information including a first map that includes identification information of a travel lane and a second map that does not include the identification information of the travel lane; when calculating a route from the current position of a vehicle to a destination, calculating the route so as to achieve a predetermined relationship between a first travel cost for traveling along a first route that belongs to the first map and a second travel cost for traveling along a second route that belongs to the second map; creating a driving plan for the vehicle to travel along the route; and causing a vehicle controller to execute the driving plan.

14 Claims, 12 Drawing Sheets

(58) Field of Classification Search
CPC ............ G01C 21/3469; G01C 21/3461; G01C 21/3658; G01C 21/3691; G05D 1/0217; G05D 1/0285; G05D 2201/0212; G08G 1/096833; G08G 1/0969
See application file for complete search history.

(56) References Cited

U.S. PATENT DOCUMENTS

| | | | |
|---|---|---|---|
| 2016/0138924 A1* | 5/2016 | An | G01C 21/34 701/25 |
| 2016/0305787 A1 | 10/2016 | Sato et al. | |
| 2017/0010613 A1 | 1/2017 | Fukumoto | |

FOREIGN PATENT DOCUMENTS

| | | |
|---|---|---|
| JP | 2010-026951 A | 2/2010 |
| JP | 2010-198260 A | 9/2010 |
| JP | 2015-141050 A | 8/2015 |
| JP | 2015-206655 A | 11/2015 |
| JP | 2017-032421 A | 2/2017 |
| WO | 2015/129366 A1 | 9/2015 |
| WO | 2017/051478 A1 | 3/2017 |

OTHER PUBLICATIONS

Wendling Barbara et al: "First Revision of J3016—Update On Task Force Activities Chair, J3016 Task Force (SAE On-Road Automated Vehicle Standards Committee)", Jan. 16, 2014 (Jan. 16, 2014), XP055858217.

* cited by examiner

FIG. 2

| | MAP INFORMATION | FIRST MAP (MP1) | SECOND MAP (MP2) |
|---|---|---|---|
| INFORMATION | BOUNDARY INFORMATION | FIRST AREA | SECOND AREA |
| | TWO-DIMENSIONAL POSITION INFORMATION | ○ | ○ |
| | THREE-DIMENSIONAL POSITION INFORMATION | ○ | ✕ |
| | ROAD INFORMATION | ○ | ○ |
| | ROAD ATTRIBUTE INFORMATION | ○ | ○ |
| | UPBOUND/DOWNBOUND INFORMATION | ○ | ○ |
| | LANE IDENTIFICATION INFORMATION | ○ | ✕ |
| | CONNECTION DESTINATION LANE | ○ | ✕ |
| DRIVING CONTROL | DRIVING CONTROL LEVEL | FIRST DRIVING CONTROL | SECOND DRIVING CONTROL |
| | 1 INTERSECTION DRIVING CONTROL | ○ | ✕ |
| | 2 MERGING/BRANCH DRIVING CONTROL | ○ | ✕ |
| | 3 LANE CHANGE DRIVING CONTROL | ○ | ✕ |
| | 4 LANE-KEEPING DRIVING CONTROL | ○ | ○ |
| | 5 DRIVING ASSIST CONTROL BY DRIVER | ○ | ○ |

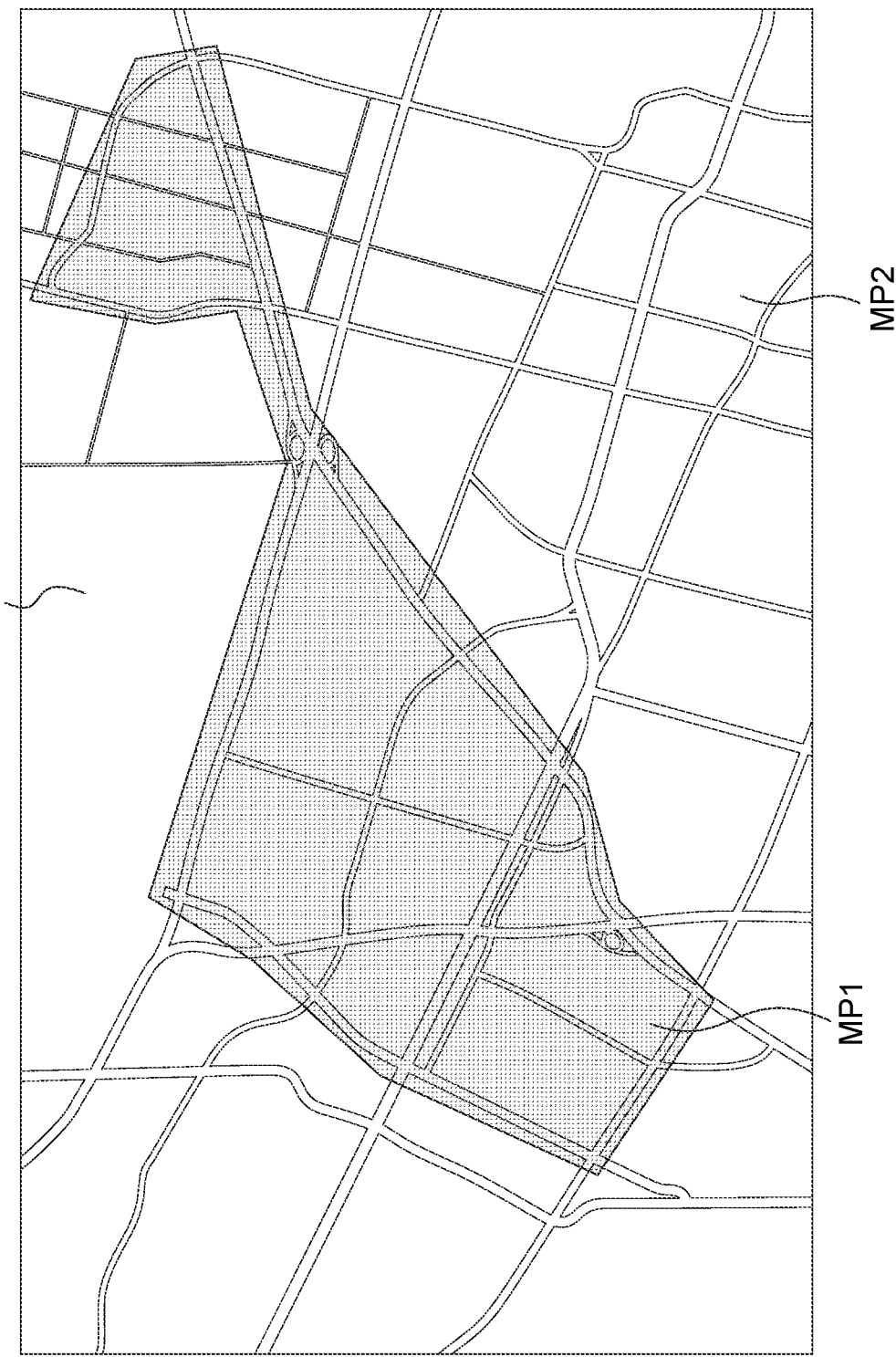

DRIVING CONTROL METHOD AND DRIVING CONTROL DEVICE

TECHNICAL FIELD

The present invention relates to a driving control method and a driving control apparatus.

BACKGROUND

A route search system is known which is configured to calculate a cost for a route on the basis of the road width and curvature and search for a route with a low cost as a recommended route (WO2015/129366).

WO2015/129366, however, has a problem in that the driving control of a vehicle cannot be performed based on a route obtained with consideration for the accuracy of map information used in automated or autonomous driving.

SUMMARY

A problem to be solved by the present invention is to perform the driving control in accordance with the accuracy of map information.

The present invention solves the above problem through referring to map information including a first map that includes identification information of a travel lane and a second map that does not include the identification information of the travel lane, calculating a route along which a first travel cost for a first route that belongs to the first map and a second travel cost for a second route that belongs to the second map is in a predetermined relationship, and creating a driving plan for the vehicle to travel along the route.

According to the present invention, the driving of the vehicle can be controlled on the basis of the driving plan in accordance with the accuracy of the map information used in the automated or autonomous driving.

BRIEF DESCRIPTION OF THE DRAWINGS

FIG. 2 is a diagram for describing an example of map information according to one or more embodiments of the present invention;

FIG. 3 is a diagram illustrating a form of the map information according to one or more embodiments of the present invention;

DETAILED DESCRIPTION

Hereinafter, one or more embodiments of the present invention will be described with reference to the drawings. In the embodiments, the present invention will be described by exemplifying examples in which the driving control apparatus for a vehicle according to the present invention is applied to a driving control system equipped in a vehicle. Embodiments of the driving control apparatus according to the present invention are not limited and can also be applied to a portable terminal device that can exchange information with the vehicle side. The driving control apparatus, the driving control system, and the portable terminal device are each a computer that executes a calculation process.

Figure 1:
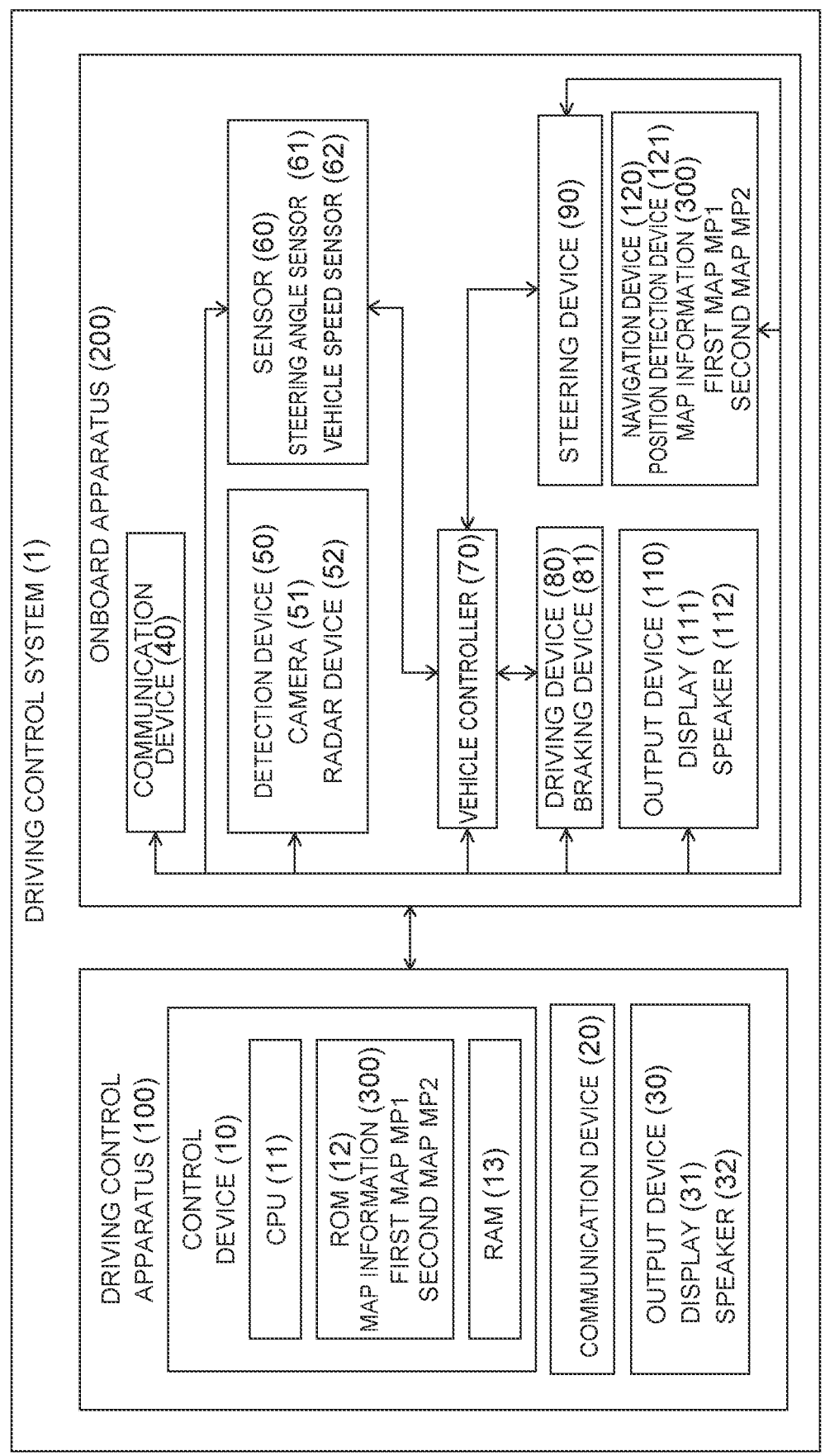
FIG. 1 is a block configuration diagram of a driving control system according to one or more embodiments of the present invention.

FIG. 1 is a diagram illustrating the block configuration of a driving control system 1 according to one or more embodiments of the present invention. The driving control system 1 includes a driving control apparatus 100 and an onboard apparatus 200. The driving control apparatus 100 and onboard apparatus 200 according to one or more embodiments of the present invention have communication devices 20 and 40, respectively, and exchange information with each other via wired or wireless communication.

The onboard apparatus 200 will first be described.

The onboard apparatus 200 according to one or more embodiments of the present invention includes a detection device 50, a sensor 60, a vehicle controller 70, a driving device 80, a steering device 90, an output device 110, and a navigation device 120. These devices which constitute the onboard apparatus 200 are connected to one another via a controller area network (CAN) or other onboard LAN to mutually exchange information.

These devices which constitute the onboard apparatus 200 will be described below.

The detection device 50 detects the existence of an object such as another vehicle and its existence position. The detection device 50 according to one or more embodiments of the present invention includes, but is not limited to including, a camera 51. The camera 51 according to one or more embodiments of the present invention is, for example, a camera that includes an imaging element such as a CCD. The camera 51 according to one or more embodiments of the present invention, which is installed in the subject vehicle, captures images around the subject vehicle and acquires image data that includes an object vehicle existing around the subject vehicle.

The camera 51 according to one or more embodiments of the present invention is attached to the rear part of the subject vehicle at the position of a height h so that the optical axis has an angle θ downward from the horizontal direction. The camera 51 captures images of a certain area behind the subject vehicle V1 from that position at a predetermined view angle Q. The view angle Q of the camera 51 is set to an angle that allows imaging not only of the travel lane in which the subject vehicle travels but also of the left and right travel lanes. The images captured by the camera 51 include those captured behind the subject vehicle.

The detection device 50 processes the acquired image data to calculate the position of an object with respect to the subject vehicle or the distance from the object to the subject vehicle. The detection device 50 calculates the relative speed and relative acceleration between the subject vehicle and the object from a variation over time of the position of the object. As for a process to calculate the positional relationship between the subject vehicle and another vehicle based on the image data and a process to calculate the speed information based on the amount of variation over time of the positional relationship, any method known at the time of filing of the present application can be appropriately used.

In addition or alternatively, the detection device 50 according to one or more embodiments of the present invention may include a radar device 52. Examples of the radar device 52 may be those, such as millimeter-wave radar, laser radar, and ultrasonic radar, which are known at the time of filing of the present application.

The sensor 60 according to one or more embodiments of the present invention includes a steering angle sensor 61 and a vehicle speed sensor 62. The steering angle sensor 61 detects steering information, such as the steering amount, steering speed, and steering acceleration of the subject vehicle, and sends the steering information to the vehicle controller 70 and the driving control apparatus 100. The vehicle speed sensor 62 detects the vehicle speed and acceleration of the subject vehicle and sends them to the vehicle controller 70 and the driving control apparatus 100.

The vehicle controller 70 according to one or more embodiments of the present invention is an onboard computer, such as an engine control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both the electric motor and the internal combustion engine as the traveling drive sources. Examples of the electric car and hybrid car having an electric motor as the traveling drive source include a type in which the power source for the electric motor is a secondary battery and a type in which the power source for the electric motor is a fuel cell.

The driving device 80 according to one or more embodiments of the present invention includes a drive mechanism of the subject vehicle. The drive mechanism includes an electric motor and/or an internal-combustion engine as the above-described traveling drive sources, a power transmission device including a drive shaft and an automatic transmission that transmit the output of the traveling drive sources to the drive wheels, and a braking device that brakes the wheels. The driving device 80 generates respective control signals for these components of the drive mechanism and executes the driving control including acceleration and deceleration of the vehicle. These control signals for the drive mechanism are generated on the basis of input signals by an accelerator operation and a brake operation of the driver and control signals acquired from the vehicle controller 70 or from the driving control apparatus 100. Control information may be sent to the driving device 80, which can thereby perform the driving control including acceleration and deceleration of the vehicle in an autonomous manner. In the case of a hybrid car, the driving device 80 may receive a ratio of the torque output to the electric motor and the torque output to the internal-combustion engine in accordance with the traveling state of the vehicle.

Acquiring the control information from a control device 10, the vehicle controller 70 controls the driving device 80 and the steering device 90 so that the subject vehicle V1 travels along a target route. The vehicle controller 70 controls the steering device 90 using the road shape detected by the detection device 50, the road information from the navigation device 120, and a lane mark model stored in map information 300 so that the subject vehicle travels while keeping a certain lateral position with respect to the travel lane. The steering device 90 according to one or more embodiments of the present invention includes a steering actuator. The steering actuator includes a motor and other necessary components attached to the steering column shaft. The steering device 90 executes the steering control for the vehicle on the basis of a control signal acquired from the vehicle controller 70 or an input signal by the steering operation of the driver. The vehicle controller 70 calculates a steering control amount on the basis of information on the steering angle acquired from the steering angle sensor 61, the vehicle speed acquired from the vehicle speed sensor 62, and a steering actuator current and sends a current command to the steering actuator thereby to perform control such that the subject vehicle travels through a target lateral position. The method of controlling the lateral position of the subject vehicle V1 is not limited to using the above-described steering device 90. In addition or alternatively, the driving device 80 and/or a braking device 81 may be used to control the travel direction (i.e. the lateral position) of the subject vehicle V1 on the basis of the rotational speed difference between the right and left drive wheels. In this sense, the "steering" of a vehicle is intended to encompass the cases of using the driving device 80 and/or the braking device 81 in addition to the cases of using the steering device 90.

The navigation device 120 according to one or more embodiments of the present invention calculates a route from the current position of the subject vehicle to a destination and outputs route guidance information via the output device 110 which will be described later. The navigation device 120 includes a position detection device 121 and map information 300 that is readable. The position detection device 121 is responsible to the global positioning system (GPS) and detects the position (latitude/longitude) at which the vehicle is traveling. The navigation device 120 refers to the map information 300 to specify a road link on which the subject vehicle travels, on the basis of the current position of the subject vehicle detected by the position detection device 121.

The map information 300 of the navigation device 120 is in common with map information 300 possessed by the driving control apparatus 100 which will be described later. The map information 300 may be provided in the navigation device 120 and may also be provided in the driving control apparatus 100. The map information 300 will be described later.

The driving control apparatus 100 according to one or more embodiments of the present invention will be described below.

As illustrated in FIG. 1, the driving control apparatus 100 according to one or more embodiments of the present invention includes a control device 10, a communication device 20, and an output device 30. The communication device 20 exchanges information with the onboard apparatus 200.

The driving control apparatus 100 executes control to assist the driver's driving operation. The control device 10 assists the driver's steering operation. The control device 10 calculates the movement amount and/or movement speed in the lateral direction (vehicle width direction) on the basis of the route and assists control of the steering device 90 on the basis of the steering angle corresponding to the movement amount. The control device 10 also assists the driver's accelerator operation and brake operation. The control device 10 calculates the movement amount and/or movement speed in the longitudinal direction (vehicle length direction) and assists control of the driving device 80 and/or braking device 81 in accordance with the movement amount and/or the movement speed.

The control device 10 of the driving control apparatus 100 is a computer including a read only memory (ROM) 12 that stores programs for executing the driving control of the subject vehicle, a central processing unit (CPU) 11 as an operation circuit that executes the programs stored in the ROM 12 to serve as the driving control apparatus 100, and a random access memory (RAM) 13 that serves as an accessible storage device. The control device 10 according to one or more embodiments of the present invention executes each function by cooperation of software for realizing the above functions and the above-described hardware.

The control device 10 of the driving control apparatus 100 includes map information 300.

The map information 300 according to one or more embodiments of the present invention will be described.

The map information 300 includes a first map MP1 and a second map MP2. The first map MP1 is a map with higher accuracy than that of the second map MP2. The first map MP1 includes identification information of the travel lane, and the second map MP1 does not include identification information of the travel lane. Links in one or more embodiments of the present invention are defined for each travel lane. Each travel lane represents information with which the lane is specified while each link represents information with which a section is identified by nodes.

FIG. 2 lists the content of information of the first map MP1 and second map MP2 and the content of driving control that can be realized when using the content of information. The first map MP1 includes boundary information that indicates an area of the first map MP1. Using this boundary information, a determination can be made as to whether or not the current position or each point on the route belongs to the area of the first map MP1. If the boundary between a first area and a second area is not clearly defined, the boundary may be defined by the road types of arterial roads and urban roads. In an embodiment, arterial roads can be defined as the first area while other urban roads can be defined as the second area. This is because it is highly possible that the first map MP1 has been created for arterial roads. In a structure of the map information, the first map MP1 is created only for the first area, but the second map MP2 is created for the entire area including the first area and the second area. When the first map MP1 exists for the first area, the area of the second map MP2 corresponding to the first area is not used, and only the second area other than the first area is used. When the second map MP2 exists for the first area, it is possible to use the second map MP2 of the first area.

The first map MP1 has two-dimensional information and three-dimensional information. The first map MP1 has road information, road attribute information, and upbound/downbound information of roads. The first map MP1 has identification information for specifying each single lane and connection destination lane information for identifying a lane to which each lane is connected. The identification information for identifying a lane enables the control device 10 to predict a lane to travel in the future. The second map MP2 has two-dimensional information. The second map MP2 has road information, road attribute information, and upbound/downbound information of roads. The second map MP2 does not include identification information for specifying each single lane and connection destination lane information for identifying a lane to which each lane is connected. When using the second map MP2, the control device 10 cannot predict a lane to travel in the future because the identification information for specifying a lane is not included.

Driving control is based on processes of recognition, determination, and operation. The recognition process can use not only the map information but also the detection information from a camera, a radar sensor, an attitude sensor, or the like. In the driving control, the accuracy of the map information affects the accuracy of the recognition process.

To perform high-level autonomous driving such that a vehicle travels along a route in an autonomous manner without requiring human operation, accurate recognition of a travel lane for the vehicle to travel in the future is required. To accurately perform forward prediction (recognition) that enables autonomous driving, highly accurate digital map information (highly accurate map, dynamic map) is required. In other words, to execute the autonomous driving at a high level, the first map MP1 is required with which at least a lane can be identified.

The term "autonomous driving" has a broad meaning. The "autonomous driving" refers to various levels from a level of the autonomous driving in which the driver is temporarily relieved from the steering operation to a level of the autonomous driving in which the vehicle moves to the destination in an autonomous manner even when the driver or a passenger does not perform the driving operation at all (fully autonomous driving). In the present description, the driving control in which the driver is temporarily relieved from the steering operation is defined as a low level of the autonomous driving, and the driving control in which the vehicle moves to the destination in an autonomous manner even when the driver or a passenger does not perform the driving operation at all is defined as the highest level of the autonomous driving. The less the operations required of the driver or a passenger/the more the operations executed by the vehicle, a determination is made that the level of the autonomous driving is higher.

The content of the driving control and the autonomous driving level are listed in FIG. 2. Examples of the driving control with a high level of the autonomous driving include 1) intersection driving control, 2) merging/branch driving control, and 3) lane change driving control. Such driving control with a high level of the autonomous driving (necessity of human determination is low) requires a high level of recognition. Accordingly, such driving control requires the first map MP which is highly accurate map information.

FIG. 2 further lists 4) lane-keeping driving control as the driving control with a low level of the autonomous driving. The lane-keeping driving control is to control the lateral position of the vehicle so as not to deviate from the currently traveling lane. This driving control does not require a level of recognition to accurately estimate the forward situation for the vehicle to travel in the future. This driving control can therefore be executed using the second map MP2 without requiring the first map MP1 which is highly accurate map information. Control of 5) for performing an assist on driving by the driver is to assist the driver's operation and is on the assumption of the driver's operation. It can be positioned as the driving control with the lowest level of the autonomous driving.

The first driving control performed using the first map MP1 includes the lane change driving control by the autonomous driving which uses a lane prediction result in the traveling direction of the vehicle, while the second driving control does not include the lane change driving control. The first map MP1 and the content of the first driving control are associated with each other and the second map MP2 and the content of the second driving control are associated with each other; therefore, the driving control can be carried out with different levels of the autonomous driving in accordance with the change of the map to be referred to.

In the autonomous driving, the control device 10 estimates the position of the vehicle using the first map MP1 which is a highly accurate map including at least the identification information for each lane, determines the travel lane for the vehicle and the future travel lane for the vehicle, determines the situation of obstacles and travel paths in the travel lane, and controls the lateral position of the vehicle (steering/steering amount/steering speed) and the longitudinal position of the vehicle (operation/operation amount/operation speed of accelerator/brake) in accordance with the situation thereby to execute the autonomous driving.

To perform the driving control for moving from the currently traveling lane to an adjacent lane or turning to the right or left from the currently traveling lane, it is necessary to predict the lane for the subject vehicle to travel in the future and recognize the lane connection relationship. By using the first map MP1 including the information for identifying each lane, it is possible to accurately predict the lane for the subject vehicle to travel in the future. To drive along a route to the destination in an autonomous manner, that is, to perform lane change, passage through an intersection, and/or passage through a merging/branching point for heading to the destination by the autonomous driving, the lane for the subject vehicle to travel in the future has to be identified. In order for the control device 10 to execute the driving plan by the autonomous driving, it is necessary to accurately recognize the lane to travel in the future, which requires the first map MP1 including identification information of each lane.

On the other hand, the lane-keeping (lane departure prevention) driving control is executable as long as the lane in which the subject vehicle is currently traveling or has been traveling immediately before can be identified, such as using captured images. To perform the lane-keeping driving control, it may be enough to identify a road including a plurality of lanes. The lane-keeping driving control can be executed using the second map MP2 which does not include the identification information of each lane. As listed in FIG. 2, the second map MP2 does not include the lane identification information and the connection destination information for each lane. The second map MP2 does not include the three-dimensional positional information.

The lane-keeping driving control includes recognizing the travel lane, in which the vehicle is traveling, and controlling the movement of the vehicle so as to keep a certain relationship between the position of a lane mark of the travel lane and the position of the subject vehicle. The lane mark may be a line drawn on a road surface and may also be a road structure existing on the side of a road shoulder of a lane, such as a guardrail, a curbstone, a sidewalk, and an exclusive road for two wheels or a structure, such as a traffic sign, a store, or a roadside tree.

To carry out the autonomous driving, a highly accurate map including at least the lane identification information is needed, but it requires immeasurable costs and efforts to create a highly accurate map in which the lane identification information is provided for all areas. It may not be realistic that highly accurate maps are created for all regions in the country and in the world. When the autonomous driving control is explained, it is assumed that highly accurate maps of all regions exist experimentally or virtually, but the map information actually used may have to involve maps in which highly accurate maps and roughly accurate maps are mixed. In an embodiment, highly accurate maps can be employed only for heavily-trafficked areas, areas in which the autonomous driving is carried out, and arterial roads. The map information according to one or more embodiments of the present invention may be presented by one map that includes the first map MP1 and the second map MP2 in different areas or may also include the first map MP1 and the second map MP2 as respective map data. The second map data MP2 may include a map (roughly accurate map) of the entire area including the first area and the second area.

FIG. 3 illustrates an example of the map information 300. The map information 300 illustrated in FIG. 3 includes a first map MP1 of a first area and a second map MP2 of a second area other than the first area. The first map MP1 of the map information 300 is a highly accurate map of the first area which includes arterial roads and is surrounded by arterial roads.

The map information 300 includes road information. The road information includes, for each link, attributes such as a road type, a road width, a road shape, and whether or not the overtaking is permitted (whether or not the lane change to an adjacent lane is permitted). The attribute of each lane is stored for each link as an item of the road information of the first map MP. The road information can be used to identify a lane with an attribute of traveling at a relatively low speed and a lane (overtaking lane) with an attribute of traveling at a relatively high speed. The road information of the first map MP1 includes the relative position of each lane. The road information includes, for each lane, an attribute such as being the rightmost lane of a road, being the leftmost lane of a road, being the n-th lane, or being a lane for which another lane exists on the right or left.

As described above, there are executable driving control and inexecutable driving control depending on the accuracy of the map information 300. As an example, FIG. 2 lists the executable driving control in the first map MP and the second map MP2. When using the first map MP, the executable driving control includes the intersection driving control and the merging/branch driving control which are considered to have the highest technical difficulty and the lane change driving control which is the basis of the intersection driving control and the merging/branch driving control. When using the second map MP2, these three forms of driving control are difficult to carry out. As will be understood, the control device 10 is required to have the ability to execute the driving control using the first map MP1.

The lane-keeping driving control, which is technically easy (i.e., the autonomous driving level is low), can be executed using any of the first map MP and the second map MP2. Likewise, regardless of which of the first map MP1 and the second map MP2 is used, the mode for assisting the driving based on the driver's intention (in which the driver determines the driving operation and assists the operation) can be executed.

Processes executed by the control device 10 will then be described.

The control device 10 acquires a destination of the vehicle. The destination may be specified by the input made by the driver or a passenger or may also be designated by the driving control apparatus 100 on the basis of the past history.

The control device 10 refers to the first map MP and/or the second map MP2 to calculate a route from the current position of the vehicle to the destination. Any route search method known at the time of filing of the present application may be used for calculation of the route.

In the route calculation process, the control device 10 calculates the route so as to achieve a predetermined relationship between a first travel cost for a first route that belongs to the first map MP1 and a second travel cost for a second route that belongs to the second map MP2. In other words, the predetermined relationship is defined as to whether to employ a route for preferentially passing through the first route belonging to the first map MP1 or a route for preferentially passing through the second route belonging to the second map MP2, and the route is calculated based on the definition. This allows the driving plan to be created so as to arbitrarily set the ratio of the first route along which the high-level autonomous driving can be carried out, and the autonomous driving can be utilized in accordance with the environment and the situation.

Figure 4:
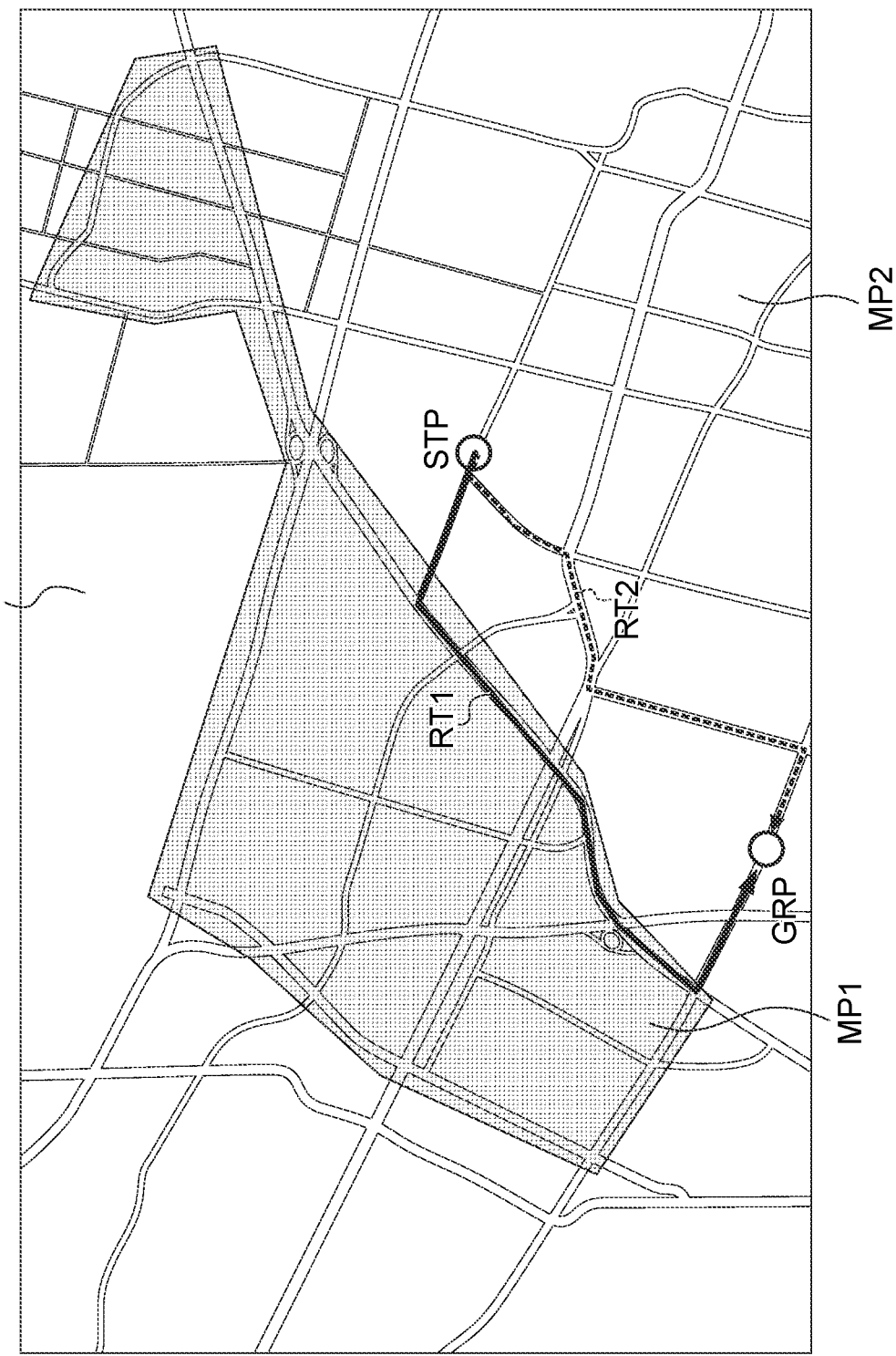
FIG. 4 is a first diagram for describing a method of calculating a route according to one or more embodiments of the present invention.

FIG. 4 illustrates two routes in the map information 300 illustrated in FIG. 3 from a start point STP at which driving is started to a goal point GRP which is the destination. Most portions of the first route RT1 belong to the first area for which the first map MP1 is prepared, whereas most portions of the second route RT2 belong to the second area for which the first map MP1 is not prepared (but the second map MP2 is prepared).

When it is desired to relatively prioritize the travel by the autonomous driving, the ratio of the first travel cost to the second travel cost may be set high. In contrast, when it is desired to utilize only the lane-keeping driving control without performing a lane change or the like, the ratio of the first travel cost to the second travel cost may be set low. In one or more embodiments of the present invention, the route is calculated such that the first travel cost is higher than the second travel cost. That is, the ratio of the first travel cost to the second travel cost is set high. Thus, the driving plan can be created with a route along which the autonomous driving is utilized as much as possible.

In the example illustrated in FIG. 4, the first route RT1 is a route with a high ratio of the first travel cost to the second travel cost, and the second route RT2 is a route with a low ratio of the first travel cost to the second travel cost. The second route RT2 of this example does not pass through the first area, so the ratio of the first travel cost to the second travel cost is zero. The second route RT2 is the shortest route from the start point STP to the goal point GRP, but from the viewpoint of selecting a route along which the autonomous driving can be easily performed, the ratio of the first travel cost to the second travel cost is set high, so that the first route RT1 is calculated as a route of the driving plan.

The first travel cost for the first route may involve the distance of the first route or may also involve a first required time for traveling along the first route. The same applies to the second travel cost for the second route. The required time for traveling can be calculated on the basis of the traveling speed (speed limit, average speed, measured speed) on a road included in the map information 300 and the distance of the route. When the travel cost is calculated based on the distance, the calculation load can be reduced. When the travel cost is calculated based on the required time, the driving plan for the route can be created with consideration for the situation.

Also when the policy of prioritizing the autonomous driving is employed, an unduly long traveling time is not preferred. When the cost for the calculated route is higher than the cost for the shortest route by more than a predetermined evaluation cost, the calculated route may be a roundabout route even though the high-level autonomous driving can be performed. Although the distance traveled by the high-level autonomous driving is shortened, the cost for arriving at the destination can be reduced. The control device calculates the cost for the shortest route to the destination, and when a cost for the calculated route as a whole is higher than the cost for the shortest route by more than the predetermined evaluation value, the control device reduces the ratio of the first travel cost to the second travel cost. This allows the route to be calculated with consideration for the traveling time. In an alternative embodiment, the shortest route may be preliminarily calculated and employed as the route.

With reference to predefined first driving control that is executable using the first map MP1 and predefined second driving control that is executable using the second map MP2, when the intended driving control is included in the first driving control and is not included in the second driving control, the ratio of the first travel cost to the second travel cost is set high. For example, when it is desired to execute a lane change for the autonomous driving, the lane change driving control is included in the driving control executable using the first map MP1, but is not included in the driving control executable using the second map MP2. In such a case, the ratio of the first travel cost to the second travel cost is set high. Through this setting, the route is calculated so as to preferentially utilize the first map MP1, and the driving plan can be created such that the desired driving control is preferentially carried out. In a route along which the second map MP2 is preferentially utilized, it is expected that the level of driving control (such as the content of the executable driving control) will be lowered. When it is desired to carry out the high-level driving control (such as the automated or autonomous driving) which cannot be executed along the second route, the ratio of the first travel cost to the second travel cost can be set high thereby to calculate the route along which the first map MP is preferentially utilized.

Upon calculation of the route, when a plurality of route candidates to the destination is calculated, the control device 10 selects, from among the route candidates, a route candidate having a small number of contact points (link points, connection points, join points) between the first route and the second route. The number of contact points between the first route and the second route corresponds to the number of times of switching (linking, connecting) between the first driving control using the first map MP1 and the second driving control using the second map MP2. At the switching point of the driving control, initiative of the driving switches to the driver and it is therefore necessary to announce the fact to the driver so that the driver can recognize the fact. In addition, switching of the driving control causes some change in the behavior of the vehicle, and the change is perceived by the driver or a passenger. It is preferred that the announcement burden and the number of times of behavior changes be small. The control device 10 selects, from among the route candidates, a route candidate having a small number of contact points between the first route and the second route, and the driving control can thereby be executed such that the number of times of announcement processes to the driver is small and the vehicle behavior is smooth (i.e., the number of times of changes is small).

Figure 5:
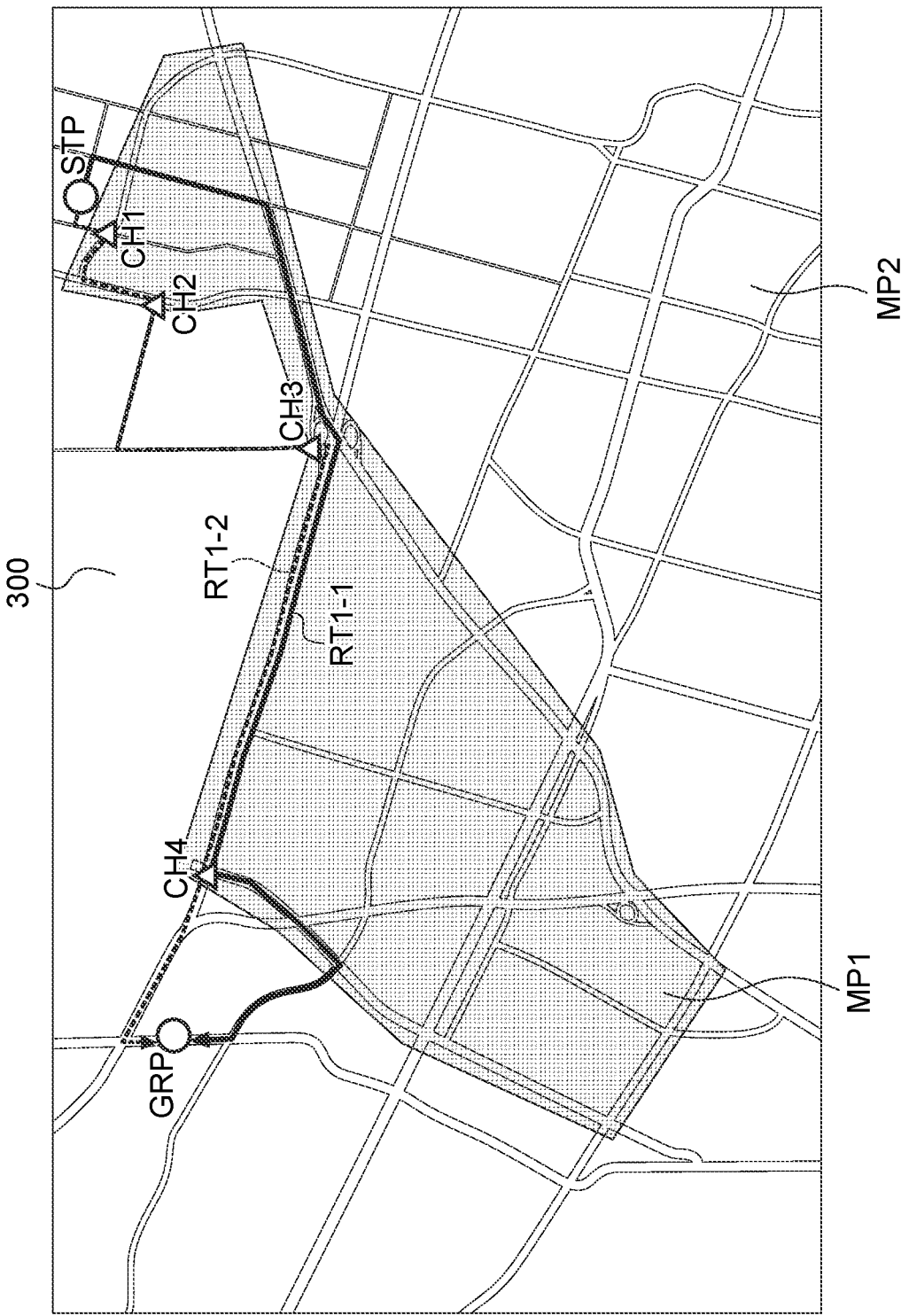
FIG. 5 is a second diagram for describing a method of calculating a route according to one or more embodiments of the present invention.

FIG. 5 illustrates two routes of first routes RT1-1 and RT102 in the map information 300 illustrated in FIG. 3 from a start point STP at which driving is started to a goal point GRP which is the destination. It is assumed that, in any of the first routes RT1-1 and RT1-2, the first travel cost and the second travel cost satisfy a predetermined relationship. When following the first route RT1-2 (indicated by a broken line) illustrated in FIG. 5 from the start point STP, the vehicle enters a first area MP1 at a point CH1, exits the first area MP1 at a point CH2, reenters the first area MP1 at a point CH3, and exits the first area MP1 at a point CH4 to reach the goal point GRP. The number of times of passing through the boundary of the first area MP1 is four. On the other hand, the first route RT1-1 (indicated by a solid line) involves passing through the boundary of the first area MP1 twice from the start point STP to the goal point GRP. By using the first route RT1-1 with a small number of times of entry to and exit from the first area MP1 as the route, the driving control can be executed such that the vehicle behavior is smooth (i.e., the number of times of changes is small). Moreover, it is possible to relatively reduce the number of times of processes for announcing that the driving control will be changes to the driver.

The predetermined relationship between the first travel cost and the second travel cost can be determined by the ratio between the first travel cost and the second travel cost set by the driver or a passenger of the vehicle. A determination can be made as to whether or not the high-level driving control is prioritized, depending on the driver's own driving load, physical condition, preference, habits, etc.

As described above, the map information 300 is made such that the level of detail of maps (the first map and the second map) and the content of the executable driving control are associated with each other, and it is therefore easy for the driver to determine whether the first route or the second route is to be prioritized, from the content of the driving control, the driver's own driving load, etc. Moreover, the content of the driving control can be predicted depending on whether the first route or the second route is to be prioritized, because the level of detail of the maps and the content of the driving control are preliminarily associated with each other, and it is therefore possible to suppress the uncomfortable feeling given to the driver and passengers.

To assist the prediction to be made by the driver or a passenger, the control device 10 sends, to the onboard apparatus 200, a command for presenting the contact points (link points, connection points, join points) between the first route and the second route along the calculated route using the output devices 30 and/or 110. By preliminarily knowing the point at which the level of driving control changes, the driver or a passenger of the vehicle can preliminarily respond to the change in the vehicle behavior due to the change in the driving control.

The control device 10 presents the route on the displays 31 and/or 111 so that the first route and the second route can be identified. In addition or alternatively, by displaying the route on the output device 110, such as a touch panel display, with which input is possible, the driver's selection of a route candidate can be accepted. When a plurality of route candidates is calculated, the route based on the intention of the driver or a passenger can be selected. The control device 10 creates a driving plan based on the selected route candidate. The content of the first driving control is associated with the first route and the content of the second driving control is associated with the second route; therefore, the driving control content can also be confirmed together by confirming the route. By preliminarily knowing the change in the level of driving control, the driver or a passenger of the vehicle can preliminarily respond to the change in the vehicle behavior due to the change in the driving control.

The control device 10 acquires weather information at the time of traveling. When the weather information represents a predetermined bad weather that increases the driving load, the control device 10 sets the route so as to increase the ratio of the first travel cost to the second travel cost. The weather information while traveling may be determined by a raindrop sensor, wiper drive information, a thermometer, etc. Any method known at the time of filing of the present application can be used as the method of weather determination during the vehicle travel. The weather information during the travel or in future traveling may be acquired from an external server via the communication device 20. The predetermined bad weather that increases the driving load can be preliminarily defined. In the case of rainfall or snowfall, a determination may be made that the weather is bad, or in the case of rainfall, when the amount of rainfall is a predetermined value or more, a determination may be made that the weather is bad. When the weather is bad, it is reliable to travel by the high-level driving control along the first route for which the highly accurate map information (first map MP1) is fully provided, than the driver driving in a situation in which traveling is difficult. In one or more embodiments of the present invention, when a determination is made that the weather is bad, the safe travel can be achieved by calculating a route (long distance or long traveling time) along which priority is given to the first route that allows the high-level driving control to be carried out.

The control device 10 performs the calculation of routes in two stages in accordance with the degree of bad weather. The control device makes a first level determination that the weather is bad and a second level determination that the weather is very bad and affects the performance of the sensor 60. The first level is determined on the basis of a first amount of rainfall/snowfall. The second level is determined on the basis of a second amount of rainfall/snowfall that is larger than the first amount of rainfall/snowfall. When the amount of rainfall/snowfall is equal to or larger than the second amount of rainfall/snowfall, a determination is made that "the weather is very bad." The amount of rainfall/snowfall may be acquired from an external server via the communication device 20. The amount of rainfall/snowfall may be determined to be the first/second amount of rainfall/snowfall when the drive cycle of the wiper is equal to or higher than a first/second predetermined value. In this case, it is preferred not to perform the autonomous driving because the required level of recognition cannot be ensured. In the case of "very bad weather," a route with the smallest cost (distance/required time) to the destination may be calculated, or a route with a small ratio of the first cost to the second cost may be calculated so that the vehicle preferably passes through a route for traveling in the second area in which the autonomous driving is not performed.

The control device 10 acquires the traffic information of the route to the destination. When the traffic information represents a predetermined traffic disturbance that increases the driving load, the control device 10 sets the route so as to increase the ratio of the first travel cost to the second travel cost. The traffic information while traveling may be determined by the vehicle speed, the operation information of the braking device, etc. Any method known at the time of filing of the present application can be used as the method of determining the traffic situation during the vehicle travel. The traffic information during the travel or in future traveling may be acquired from the server of an intelligent transportation system via the communication device 20. The predetermined traffic disturbance that increases the driving load can be preliminarily defined. The occurrence of traffic congestion may be determined as a traffic disturbance, and even when traffic congestion occurs, traffic congestion with a predetermined distance or more and/or less than a predetermined vehicle speed may be determined as a traffic disturbance. The traffic disturbance may be determined as occurrence of an accident, traffic regulation, or damage to a road. These information items may be provided from a traffic information management center. When a traffic disturbance occurs, it is reliable to travel by the high-level driving control along the first route for which the highly accurate map information (first map MP1) is fully provided, than the driver driving in a situation in which the driving load is high. In one or more embodiments of the present invention, when a determination is made that a traffic disturbance occurs, the safe travel can be achieved by calculating a route (long distance or long traveling time) along which priority is given to the first route that allows the high-level driving control to be carried out.

The control device 10 acquires the accident history information of the route to the destination. When the accident history information represents an accident history of a predetermined number of times or more of increasing the driving load, the control device 10 sets the route so as to increase the ratio of the first travel cost to the second travel cost. The accident history information may be acquired from an external server of an intelligent transportation system or the like via the communication device 20 or may also be preliminarily downloaded as the road information. In an area or a route in which many accidents occur, it is reliable to travel by the high-level driving control along the first route for which the highly accurate map information (first map MP1) is fully provided, than the driver driving on a road on which many accidents occur. In one or more embodiments of the present invention, when the accident history is recorded a predetermined number of times or more, the safe travel can be achieved by calculating a route (long distance or long traveling time) along which priority is given to the first route that allows the high-level driving control to be carried out.

The control procedure of the driving control apparatus 100 according to one or more embodiments of the present invention will then be described with reference to FIG. 6. The content of the process in each step is as described above and the flow of the process will be mainly described below.

In step S101, the control device 10 acquires subject vehicle information that includes the current position of the subject vehicle V1. The subject vehicle information may further include the vehicle speed/acceleration of the subject vehicle V1. In step S102, the control device 10 reads the map information 300 of an area that includes the current position. The map information 300 includes the first map MP and the second map MP2.

In step S103, the control device 10 calculates a route from the current position to the destination. This route is calculated so as to achieve a predetermined relationship between a first travel cost for a first route that belongs to the first map MP1 and a second travel cost for a second route that belongs to the second map MP2. The process of calculating the route will be described later.

The control device 10 controls the output devices 30 and/or 110 to present the calculated route. FIGS. 4 and 5 described above represent the display examples. In order for the driver or a passenger to easily identify the first route and the second route, the routes are displayed with different forms (such as color, thickness, and broken lines). In addition or alternatively, in order for the driver or a passenger to easily recognize the point of entering the first area and the point of exiting the first area, the connection points are displayed in an emphasized manner.

In step S104, the control device 10 acquires the detection result of an object from the detection device 50. The detection result of an object includes information on the position of another vehicle. The control device 10 recognizes an object such as another vehicle as an obstacle which the vehicle should avoid.

In step S105, the control device 10 calculates target positions that are used as references for the driving control for the vehicle. Each target position includes a target lateral position (target X-coordinate) and a target longitudinal position (target Y-direction). The target positions are those at which the vehicle is avoided from coming close to/coming into contact with an obstacle. The target route is obtained by connecting the calculated one or more target coordinates and the current position of the vehicle V1.

In step S106, the control device 10 compares the current lateral position of the subject vehicle V1 with the target lateral position acquired in step S105 and calculates a feedback gain for the lateral position on the basis of the comparison result.

In step S107, the control device 10 calculates a target control value on the basis of the actual lateral position of the subject vehicle V1, the target lateral position corresponding to the current position, and the feedback gain of step S106. The target control value relates to a steering angle, a steering angular speed, and other necessary parameters for moving the subject vehicle V1 on the target lateral position. In step S112, the control device 10 outputs the target control value to the onboard apparatus 200. This allows the subject vehicle V1 to travel on the target route which is defined by the target lateral position.

In step S109, the control device 10 calculates the target longitudinal position along the route. In step S110, the control device 10 compares the current longitudinal position and the vehicle speed and acceleration at the current position of the subject vehicle V1 with the target longitudinal position corresponding to the current longitudinal position and the vehicle speed and acceleration at the target longitudinal position and calculates a feedback gain for the longitudinal position on the basis of the comparison results. Then, in step S111, the control device 10 calculates a target control value for the longitudinal position on the basis of the vehicle speed and acceleration corresponding to the target longitudinal position and the feedback gain for the longitudinal position calculated in step S110.

Here, the target control value in the longitudinal direction refers to a control value for each of the operation of drive mechanism (which includes the operation of an internal-combustion engine in the case of an engine car and the operation of an electric motor in the case of an electric car and may further include the torque distribution for an internal-combustion engine and electric motor in the case of a hybrid car) and the braking operation to achieve the acceleration, deceleration, and vehicle speed corresponding to the target longitudinal position. For example, in an engine car, the control function is used to calculate a target amount of intake air (target opening degree of the throttle valve) and a target amount of fuel injection on the basis of values of the current and target acceleration, deceleration, and vehicle speed and send them to the driving device 80. Alternatively, the control function may be used to calculate the acceleration, deceleration, and vehicle speed and send them to the vehicle controller 70, which may calculate a control value for each of the operation of drive mechanism (which includes the operation of an internal-combustion engine in the case of an engine car and the operation of an electric motor in the case of an electric car and may further include the torque distribution for an internal-combustion engine and electric motor in the case of a hybrid car) and the braking operation to achieve these acceleration, deceleration, and vehicle speed.

In step S112, the control device 10 outputs the target control value in the longitudinal direction calculated in step S111 to the onboard apparatus 200. The vehicle controller 70 executes the steering control and driving control to operate the subject vehicle to travel on the target route which is defined by the target lateral position and target longitudinal position. As in the previously-described steps S105 to S107 and S112, the processes of steps S109 to S112 are repeated every time the target longitudinal position is acquired, and the control value for each target longitudinal position acquired is output to the onboard apparatus 200.

In step S113, the vehicle controller 70 executes the driving control in accordance with the command from the control device 10.

In step S114, the control device 10 determines whether the driver intervenes in the operation, such as whether the driver performs the steering operation. When the operation by the driver is not detected, the routine returns to step S101, from which the setting of a new object area, calculation of a target route, and driving control are repeated. On the other hand, when the operation by the driver is detected, the routine proceeds to step S115, in which the driving control is suspended. When the driving control is suspended, the driver or passengers are informed of this fact.

Figure 6:
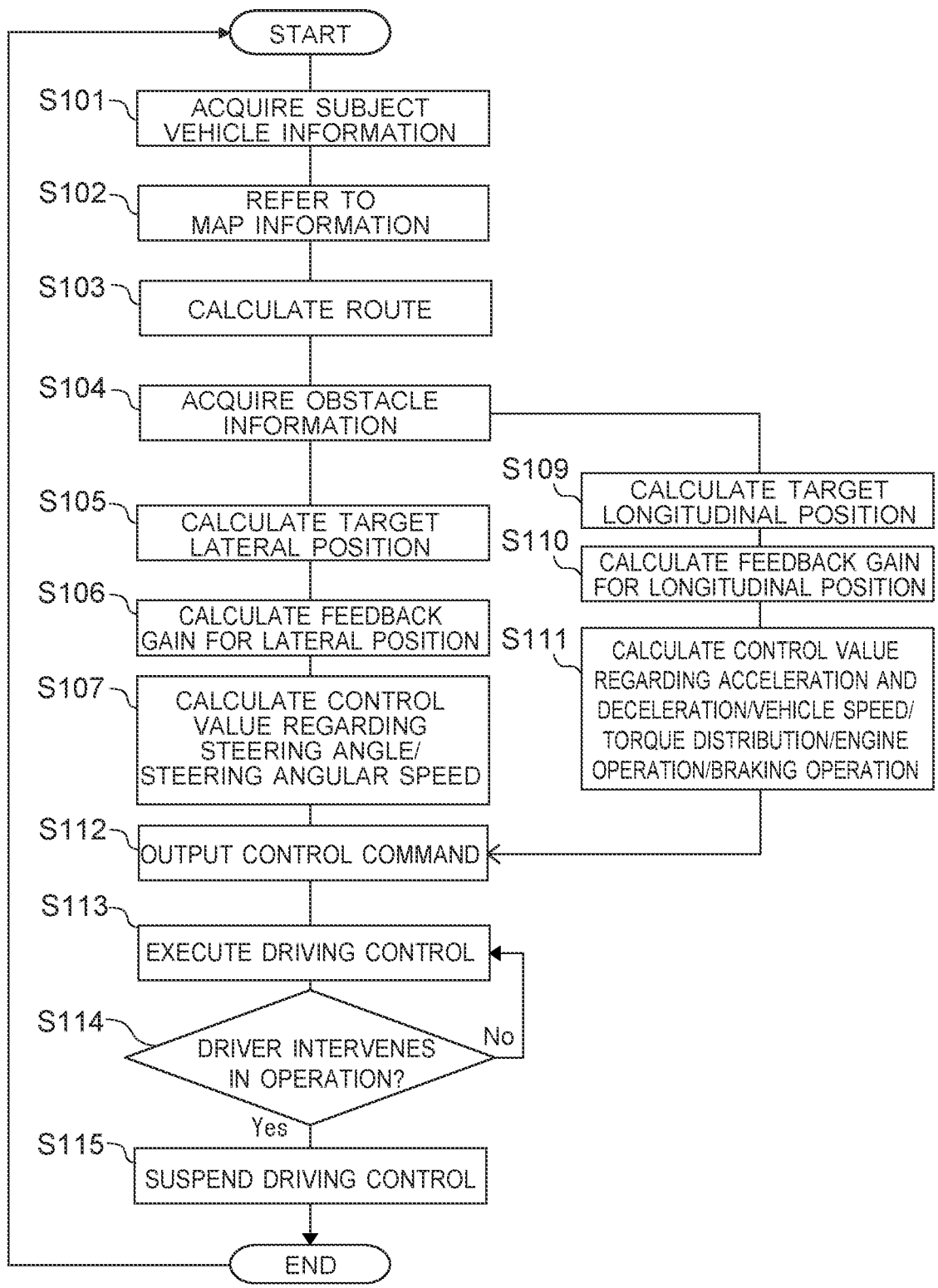
FIG. 6 is a first flowchart illustrating a driving control procedure according to one or more embodiments of the present invention.

FIGS. 7A to 7F are flowcharts for describing some methods of calculating a route of step S103 illustrated in FIG. 6.

Figure 7A:
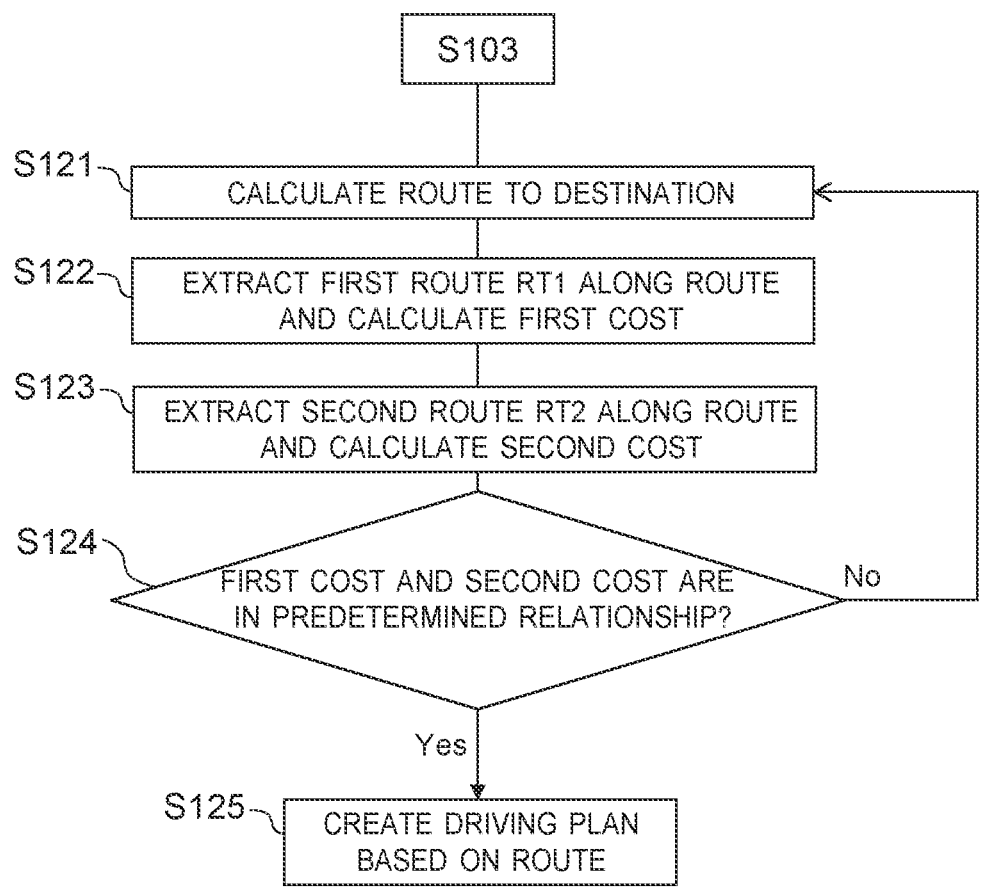
FIG. 7A is a first flowchart illustrating a route calculation process according to one or more embodiments of the present invention.

As illustrated in FIG. 7A, in step S121, the control device 10 calculates a route to the destination. In step S122, the control device 10 extracts the first route RT1 passing through the first area MP1 out of the entire route from the current position to the destination and calculates the distance/required time along the first route RT1. In step S123, the control device 10 extracts the second route RT2 passing through the second area MP2 out of the entire route from the current position to the destination and calculates the distance/required time along the second route RT2.

In step S124, the control device 10 calculates the relationship between the first cost and the second cost and determines whether or not the relationship satisfies a predetermined relationship. Examples of the predetermined relationship include the ratio of the first cost to the second cost. When prioritizing the autonomous driving (lane change driving, merging/branch driving, intersection driving), the ratio of the first cost to the second cost (predetermined relationship) is set to a high value. When prioritizing the driving assistance (lane-keeping, assistance of the operation amount, such as braking assistance), the ratio of the first cost to the second cost (predetermined relationship) is set to a low value. When the first cost and the second cost satisfy the predetermined relationship, the driving plan is created on the basis of the route. On the other hand, when the first cost and the second cost do not satisfy the predetermined relationship, a feedback process is performed on the basis of the result to obtain the first route and the second route which satisfy the predetermined relationship.

Figure 7B:
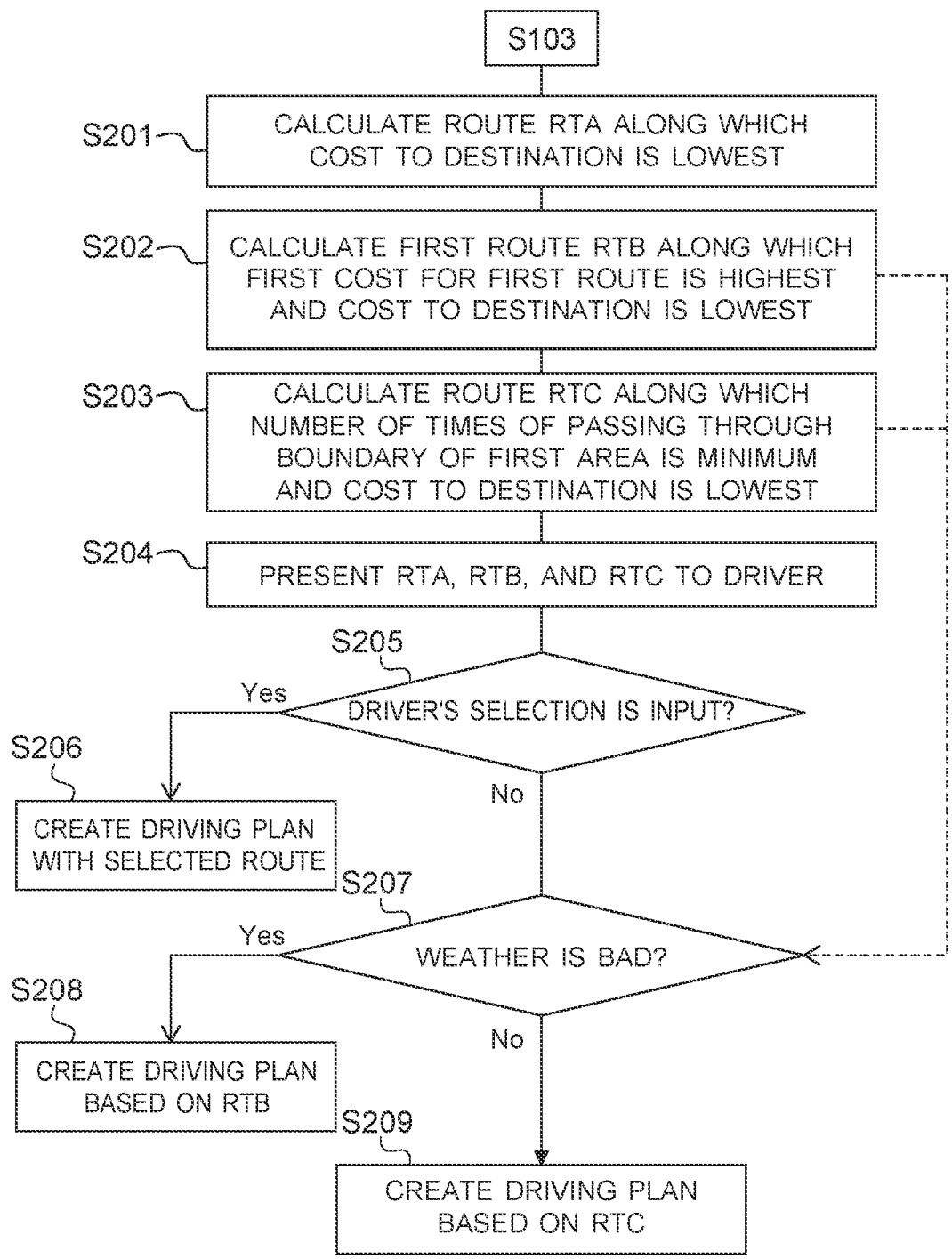
FIG. 7B is a second flowchart illustrating a route calculation process according to one or more embodiments of the present invention.

FIG. 7B illustrates a second example of the route calculation method.

In step S201, the control device 10 calculates a route RTA along which the cost (distance or required time) to the destination is lowest. In step S202, the control device 10 calculates a first route RTB along which the first cost for the first route is highest and the cost (distance or required time) to the destination is lowest. In step S203, the control device 10 calculates a route RTC along which the number of times of passing through the boundary of the first area is minimum and the cost (distance or required time) to the destination is lowest.

The route RTA is a route that is calculated only from the viewpoint of the distance or the required time, the route RTB is a route that ensures the possibility of the autonomous driving to the maximum extent, and the route RTC is a route along which the number of times of switching (linking, connecting) between the first driving control and the second driving control is small so that the priority is given to no change in the vehicle behavior. In step S204, the control device 10 controls the displays 31 and/or 111 to present the route RTA, the route RTB, and the route RTC as the options for the driver or a passenger.

In step S205, the control device 10 receives an input by the driver of selection information of the route RTA, the route RTB, and the route RTC. When the selection information is input, the routine proceeds to step S206, in which the driving plan is created with the selected route. When the selection information is not input in step S205, an appropriate route is selected on the basis of the environment. In this example, in step S207, a determination is made as to whether or not the weather is a predetermined bad weather. This determination method is as previously described. When the weather is bad, the routine proceeds to step S208, in which the route RTB for preferentially executing the autonomous driving is selected, and the driving plan is created on the basis of the route RTB. However, when the degree of bad weather is high and the weather is very bad to such an extent that the weather affects the performance of the sensor 60, the route RTA is selected so as not to execute the autonomous driving. When the weather is good, the driving plan is created on the basis of the route RTC along which the number of switching (linking, connecting) times of the driving control is small.

Figure 7C:
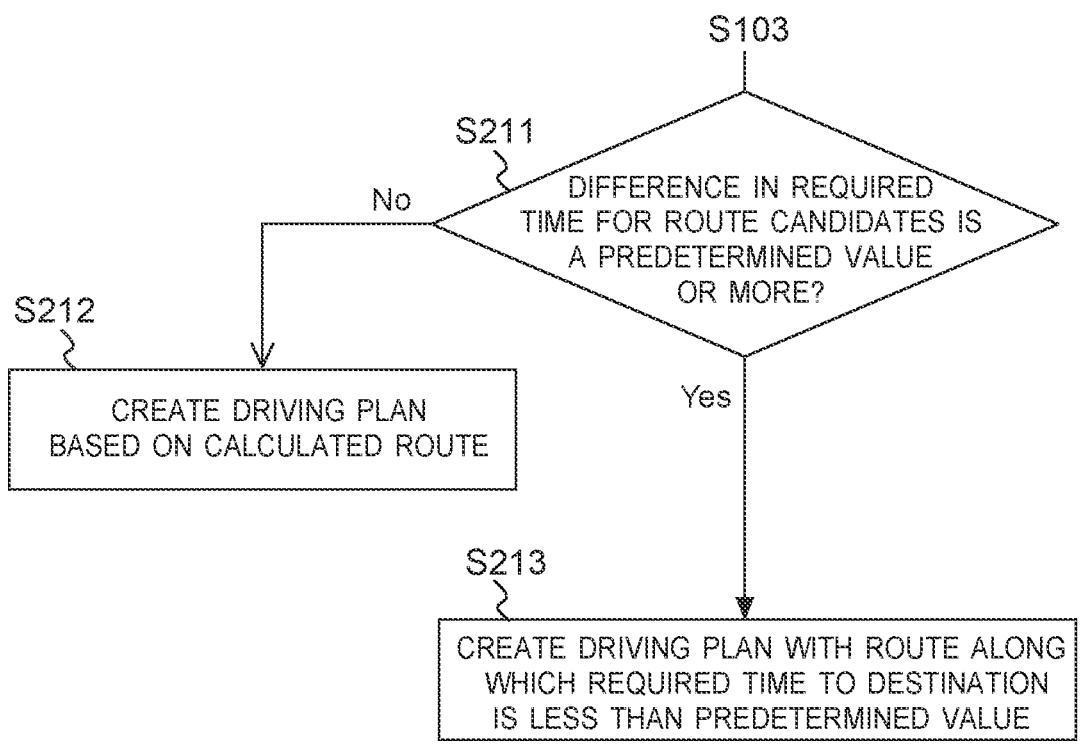
FIG. 7C is a third flowchart illustrating a route calculation process according to one or more embodiments of the present invention.

FIG. 7C illustrates a third example of the route calculation method.

In step S211, when a plurality of route candidates is calculated, the control device 10 verifies a difference in the required time for each route. When the difference in the required time for the route candidates is less than a predetermined value, each route candidate is a valid solution, so the routine proceeds to step S212, in which the driving plan is created on the basis of the calculated route. On the other hand, when the difference in the required time is the predetermined value or more, the routine proceeds to step S213, in which route candidates having a large difference in the required time are excluded, a route that most satisfies a predetermined relationship is selected from among the route candidates with a required time of less than a predetermined value, and the driving plan is created on the basis of the route.

Figure 7D:
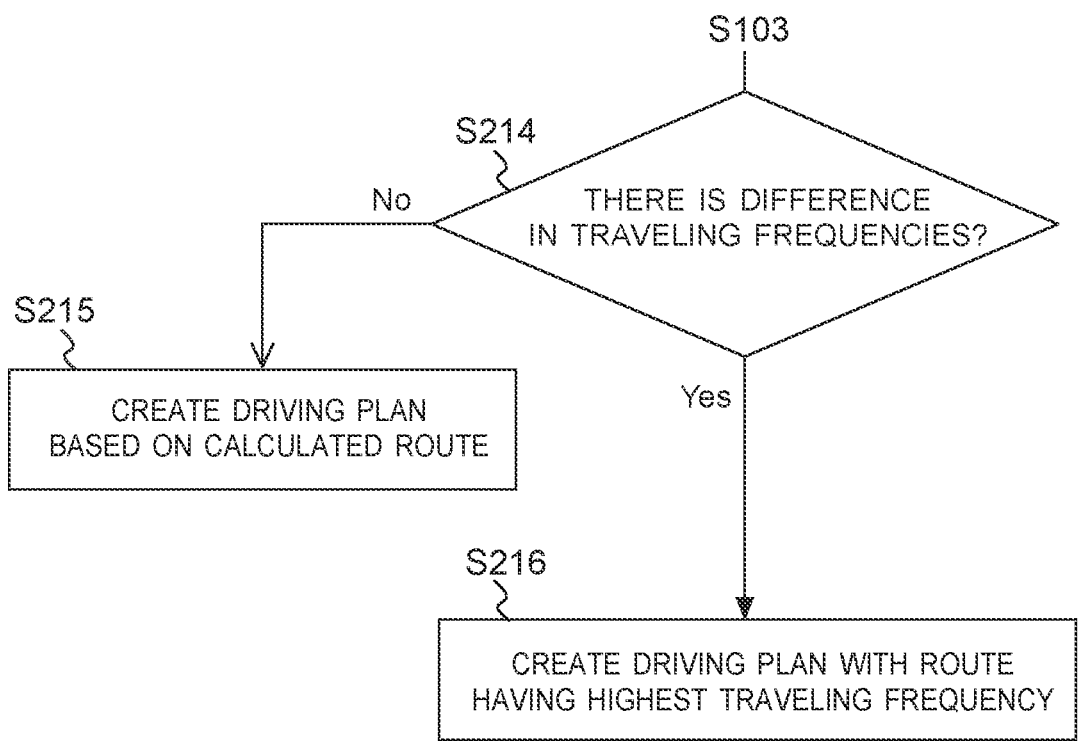
FIG. 7D is a fourth flowchart illustrating a route calculation process according to one or more embodiments of the present invention.

FIG. 7D illustrates a fourth example of the route calculation method.

In step S214, when a plurality of route candidates is calculated, the control device 10 verifies the difference in the traveling frequency for each route. The traveling frequency is determined on the basis of the traveling history stored in the navigation device 120. When the difference in the traveling frequencies for the route candidates is less than a predetermined value, the routine proceeds to step S215, in which the driving plan is created on the basis of the calculated route. On the other hand, when the difference in the traveling frequencies is the predetermined value or more, unfamiliar routes are selected, so the routine proceeds to step S216, in which route candidates having a low traveling frequency are excluded, a route having a high traveling frequency is selected, and the driving plan is created on the basis of the route.

Figure 7E:
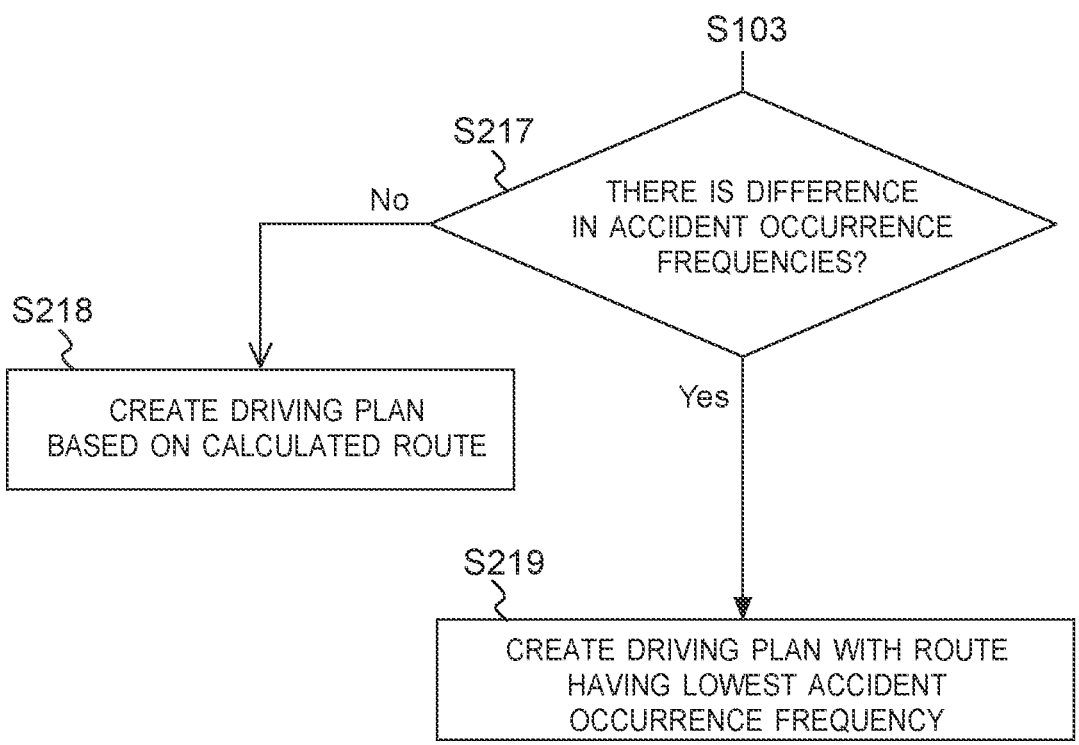
FIG. 7E is a fifth flowchart illustrating a route calculation process according to one or more embodiments of the present invention.

FIG. 7E illustrates a fifth example of the route calculation method.

In step S217, when a plurality of route candidates is calculated, the control device 10 verifies the difference in the accident occurrence frequency for each route. The accident occurrence frequency may be acquired from an external server of an intelligent transportation system or the like via the communication device 20. When the difference in the accident occurrence frequencies is less than a predetermined value, the routine proceeds to step S218, in which the driving plan is created on the basis of the calculated route. On the other hand, when the difference in the accident occurrence frequencies is the predetermined value or more, a route with many accidents may be selected, so the routine proceeds to step S219, in which a route with the lowest accident occurrence frequency is selected and the driving plan is created on the basis of the route.

Figure 7F:
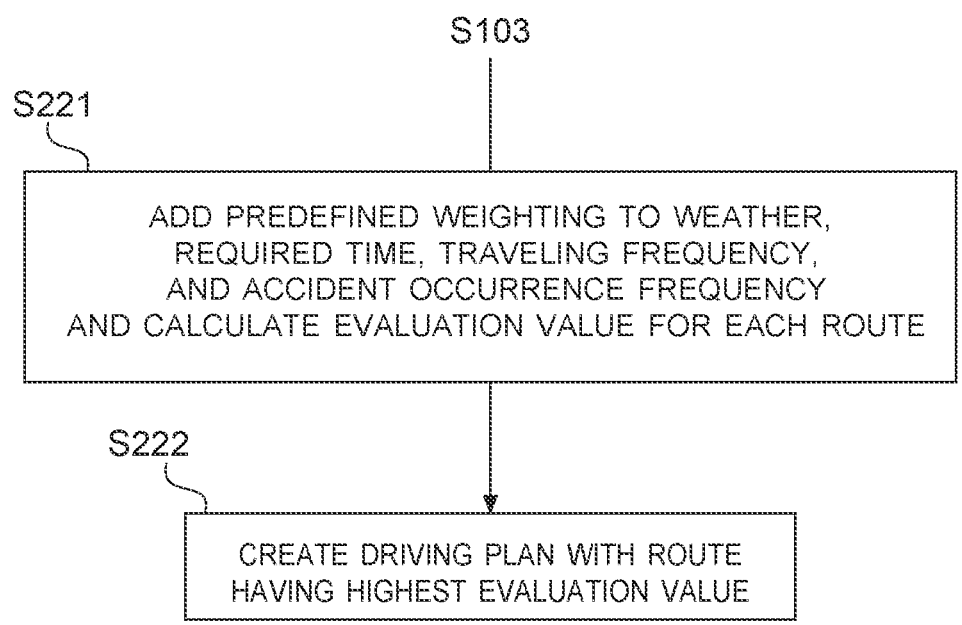
FIG. 7F is a sixth flowchart illustrating a route calculation process according to one or more embodiments of the present invention.

FIG. 7F illustrates a sixth example of the route calculation method. The above-described weather, required time, traveling frequency, and accident occurrence frequency can be reviewed at the same time. To review each situation, in step S221, the control device 10 weights the route evaluation for each of the weather, the required time, the traveling frequency, and the accident occurrence frequency. Although not particularly limited, the evaluation value for each route is obtained through multiplying a route evaluation reference value by a weighting coefficient larger than zero (0) and smaller than 1 to calculate a deduction evaluation value and subtracting the deduction evaluation value from the evaluation value (perfect score) of each route. As the weather gets worse (except when the weather is very bad), as the required time is longer, as the traveling frequency is lower, and as the accident occurrence frequency is higher, a larger weighting coefficient is set. This allows the evaluation value to be calculated for a route for which each item is reviewed. In step S222, the control device 10 specifies a route with the highest evaluation value and creates a driving plan for the route.

The driving control apparatus 100 according to one or more embodiments of the present invention is configured and operates as the above and therefore has the following effects.

(1) The driving control method according to one or more embodiments of the present invention includes calculating the route so as to achieve a predetermined relationship between the first travel cost for the first route that belongs to the first map MP1 and the second travel cost for the second route that belongs to the second map MP2. In other words, the predetermined relationship is defined as to whether to employ a route for preferentially passing through the first route belonging to the first map MP1 or a route for preferentially passing through the second route belonging to the second map MP2, and the route is calculated based on the definition. This allows the driving plan to be created so as to arbitrarily set the ratio of the first route along which the high-level autonomous driving can be carried out, and the autonomous driving can be utilized in accordance with the environment and the situation.

(2) In the driving control method according to one or more embodiments of the present invention, the first travel cost involves a first distance of the first route and the second travel cost involves a second distance of the second route; therefore, the route for preferentially passing through the first route can be calculated from the viewpoint of the distance.

(3) In the driving control method according to one or more embodiments of the present invention, the first travel cost involves a first required time obtained from a first distance of the first route and a traveling speed along the first route and the second travel cost involves a second required time obtained from a second distance of the second route and a traveling speed along the second route; therefore, the route for preferentially passing through the first route can be calculated from the viewpoint of the required time.

(4) The driving control method according to one or more embodiments of the present invention includes calculating the route so that the first travel cost is higher than the second travel cost. The ratio of the first travel cost to the second travel cost is set high. This allows the route to be calculated along which the autonomous driving can be utilized to the maximum extent, and the driving plan can be created accordingly.

(5) The driving control method according to one or more embodiments of the present invention includes referring to the map information to calculate a cost for the shortest route to the destination, and when a cost for the calculated route as a whole is higher than the cost for the shortest route by more than a predetermined evaluation cost, reducing the ratio of the first travel cost to the second travel cost. When the cost for the calculated route is higher than the cost for the shortest route by more than the predetermined evaluation cost, the calculated route may be a roundabout route even though the high-level autonomous driving can be performed. Although the distance traveled by the high-level autonomous driving is shortened, the cost for arriving at the destination can be reduced.

(6) The driving control method according to one or more embodiments of the present invention includes referring to predefined first driving control that is executable using the first map MP1 and predefined second driving control that is executable using the second map MP2, and when intended driving control is included in the first driving control and is not included in the second driving control, setting a high ratio of the first travel cost to the second travel cost. For example, when it is desired to execute a lane change for the autonomous driving, the lane change driving control is included in the driving control executable using the first map MP, but is not included in the driving control executable using the second map MP2. In such a case, the ratio of the first travel cost to the second travel cost is set high. Through this setting, the route is calculated so as to preferentially utilize the first map MP1, and the driving plan can be created such that the desired driving control is preferentially carried out.

(7) In the driving control method according to one or more embodiments of the present invention, when the route is calculated, if a plurality of route candidates to the destination is calculated, then, among the route candidates, a route candidate having a small number of contact points (link points, connection points, join points) between the first route and the second route is selected as the route. The number of contact points between the first route and the second route corresponds to the number of times of switching (linking, connecting) between the first driving control using the first map MP1 and the second driving control using the second map MP2. At the switching point of the driving control, initiative of the driving switches to the driver and it is therefore necessary to announce the fact to the driver so that the driver can recognize the fact. In addition, switching of the driving control causes some change in the behavior of the vehicle, and the change is perceived by the driver or a passenger. It is preferred that the burden of the announcement process and the number of times of behavior changes be small. The driving control method according to one or more embodiments of the present invention includes selecting, from among the route candidates, a route candidate having a small number of contact points between the first route and the second route, and the driving control can thereby be executed with smooth vehicle behavior (i.e., the number of times of changes is small). Moreover, the number of times of processes for announcing to the drive that the driving control will be changed can be relatively reduced.

(8) In the driving control method according to one or more embodiments of the present invention, the predetermined relationship between the first travel cost and the second travel cost can be determined by the ratio between the first travel cost and the second travel cost set by the driver or a passenger of the vehicle. A determination can be made as to whether or not the high-level driving control is prioritized, depending on the driver's own driving load, physical condition, preference, habits, etc.

(9) The driving control method according to one or more embodiments of the present invention includes sending, to the onboard apparatus 200, a command for presenting the driver or a passenger of the vehicle with the contact points (link points, connection points, join points) between the first route and the second route along the calculated route using the output device 110. By preliminarily knowing the point at which the level of driving control changes, the driver or a passenger can preliminarily respond to the change in the vehicle behavior due to the change in the driving control.

(10) The driving control method according to one or more embodiments of the present invention includes presenting the route on the displays 31 and/or 111 so that the first route and the second route can be identified in the route. In addition or alternatively, by displaying the route on the output device 110, such as a touch panel display, with which input is possible, the driver's selection of a route candidate can be accepted. When a plurality of route candidates is calculated, the route based on the intention of the driver or a passenger can be selected. The driving control method according to one or more embodiments of the present invention includes creating a driving plan based on the selected route candidate. The content of the first driving control is associated with the first route and the content of the second driving control is associated with the second route; therefore, the driving control content can also be confirmed together by confirming the route. By preliminarily knowing the change in the level of driving control, the driver or a passenger of the vehicle can preliminarily respond to the change in the vehicle behavior due to the change in the driving control.

(11) The driving control method according to one or more embodiments of the present invention includes acquiring weather information at the time of traveling, and when the weather information represents a predetermined bad weather that increases the driving load, setting the route so as to increase the ratio of the first travel cost to the second travel cost. The weather information while traveling may be determined by a raindrop sensor, wiper drive information, a thermometer, etc. Any method known at the time of filing of the present application can be used as the method of weather determination during the vehicle travel. The weather information during the travel or in future traveling may be acquired from an external server via the communication device 20. The predetermined bad weather that increases the driving load can be preliminarily defined. In the case of rainfall or snowfall, a determination may be made that the weather is bad, or in the case of rainfall, when the amount of rainfall is a predetermined value or more, a determination may be made that the weather is bad. When the weather is bad, it is reliable to travel by the high-level driving control along the first route for which the highly accurate map information (first map MP1) is fully provided, than the driver driving in a situation in which traveling is difficult. In one or more embodiments of the present invention, when a determination is made that the weather is bad, the safe travel can be achieved by calculating a route (long distance or long traveling time) along which priority is given to the first route that allows the high-level driving control to be carried out.

(12) The driving control method according to one or more embodiments of the present invention includes acquiring the traffic information of the route to the destination, and when the traffic information represents a predetermined traffic disturbance that increases the driving load, setting the route so as to increase the ratio of the first travel cost to the second travel cost. The traffic information while traveling may be determined by the vehicle speed, the operation information of the braking device, etc. The predetermined traffic disturbance that increases the driving load can be preliminarily defined. The occurrence of traffic congestion may be determined as a traffic disturbance, and even when traffic congestion occurs, traffic congestion with a predetermined distance or more and/or less than a predetermined vehicle speed may be determined as a traffic disturbance. The traffic disturbance may be determined as occurrence of an accident, traffic regulation, or damage to a road. These information items may be provided from a traffic information management center. When a traffic disturbance occurs, it is reliable to travel by the high-level driving control along the first route for which the highly accurate map information (first map MP1) is fully provided, than the driver driving in a situation in which the driving load is high. In one or more embodiments of the present invention, when a determination is made that a traffic disturbance occurs, the safe travel can be achieved by calculating a route (long distance or long traveling time) along which priority is given to the first route that allows the high-level driving control to be carried out.

(13) The driving control method according to one or more embodiments of the present invention includes acquiring the accident history information of the route to the destination, and when the accident history information represents an accident history of a predetermined number of times or more of increasing the driving load, setting the route so as to increase the ratio of the first travel cost to the second travel cost. In an area or a route in which many accidents occur, it is reliable to travel by the high-level driving control along the first route for which the highly accurate map information (first map MP1) is fully provided, than the driver driving on a road on which many accidents occur. In one or more embodiments of the present invention, when the accident history is recorded a predetermined number of times or more, the safe travel can be achieved by calculating a route (long distance or long traveling time) along which priority is given to the first route that allows the high-level driving control to be carried out.

(14) When the driving control method according to one or more embodiments of the present invention is executed by the control device 10, the driving control apparatus 100 exerts the same action and the same effects as those of the above driving control method.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Driving control system
100 Driving control apparatus
10 Control device
11 CPU
12 ROM
300 Map information
MP1 First map
MP2 Second map
13 RAM
20 Communication device
30 Output device
31 Display
32 Speaker
200 Onboard apparatus
40 Communication device
50 Detection device
51 Camera
52 Radar device
60 Sensor
61 Steering angle sensor
62 Vehicle speed sensor
70 Vehicle controller
80 Driving device
81 Braking device
90 Steering device
110 Output device
111 Display
112 Speaker
120 Navigation device
121 Position detection device
123 Map information
MP1 First map
MP2 Second map

The invention claimed is:

1. A driving control method comprising:
acquiring a destination of an autonomously driven vehicle;
referring to map information including a first map that includes identification information of a travel lane and a second map that does not include the identification information of the travel lane;
when calculating a route from a current position of the autonomously driven vehicle to the destination, calculating the route so as to achieve a predetermined relationship between a first travel cost for a first route that belongs to the first map and a second travel cost for a second route that belongs to the second map;
creating a driving plan for the autonomously driven vehicle to travel along the route;
transmitting a command to execute the driving plan to a controller of the autonomously driven vehicle; and
executing the driving plan by controlling the autonomously driven vehicle to travel along the route,
wherein, when traveling on the first route belonging to the first map, first driving control including lane change driving control is performed, and when traveling on the second route belonging to the second map, second driving control not including lane change driving control but including lane-keeping driving control is performed.

2. The driving control method according to claim 1, wherein the first travel cost is based on a first distance of the first route and the second travel cost is based on a second distance of the second route.

3. The driving control method according to claim 1, wherein the first travel cost is based on a first required time obtained from a first distance of the first route and a traveling speed along the first route and the second travel cost is based on a second required time obtained from a second distance of the second route and a traveling speed along the second route.

4. The driving control method according to claim 1, wherein the route is calculated so that the first travel cost is higher than the second travel cost.

5. The driving control method according to claim 4, further comprising:
referring to the map information to calculate a cost for a shortest route to the destination; and
when a cost for the calculated route as a whole is higher than the cost for the shortest route by more than a predetermined evaluation cost, reducing a ratio of the first travel cost to the second travel cost.

6. The driving control method according to claim 1, further comprising:
referring to predefined first driving control that is executable using the first map and predefined second driving control that is executable using the second map; and
when intended driving control is included in the first driving control and is not included in the second driving control, setting a high ratio of the first travel cost to the second travel cost.

7. The driving control method according to claim 1, wherein, when calculating the route from the current position, a plurality of route candidates to the destination are calculated, and a route candidate having a small number of contact points between the first route and the second route is selected as the route.

8. The driving control method according to claim 1, wherein the predetermined relationship between the first travel cost and the second travel cost is determined based on a ratio of the first travel cost and the second travel cost set by a driver or passenger of the autonomously driven vehicle.

9. The driving control method according to claim 1, wherein contact points between the first route and the second route along the route are presented using an output device.

10. The driving control method according to claim 1, wherein the route is presented using an output device so that the first route and the second route along the route can be identified.

11. The driving control method according to claim 1, further comprising:
acquiring weather information during travel; and
when the weather information represents a predetermined bad weather that increases a driving load, calculating the route so as to increase a ratio of the first travel cost to the second travel cost.

12. The driving control method according to claim 1, further comprising:
  acquiring traffic information of the route; and
  when the traffic information represents a predetermined traffic disturbance that increase a driving load, calculating the route so as to increase a ratio of the first travel cost to the second travel cost.

13. The driving control method according to claim 1, further comprising:
  acquiring accident history information of the route; and
  when the accident history information represents an accident history of a predetermined number of times or more, calculating the route so as to increase a ratio of the first travel cost to the second travel cost.

14. A driving control apparatus comprising a control device configured to cause a vehicle controller to execute a driving plan created, the control device being further configured to:
  acquire a destination of an autonomously driven vehicle;
  refer to map information including a first map that includes identification information of a travel lane and a second map that does not include the identification information of the travel lane, the identification information being stored in a readable manner;
  when calculating a route from a current position of the autonomously driven vehicle to the destination, calculate the route so as to achieve a predetermined relationship between a first travel cost for traveling along a first route that belongs to the first map and a second travel cost for traveling along a second route that belongs to the second map;
  create the driving plan for traveling along the route;
  send a command to execute the driving plan to the autonomously driven vehicle controller; and
  execute the driving plan by controlling the autonomously driven vehicle with the vehicle controller to travel along the route,
  wherein, when traveling on the first route belonging to the first map, first driving control including lane change driving control is performed, and when traveling on the second route belonging to the second map, second driving control not including lane change driving control but including lane-keeping driving control is performed.

* * * * *